United States Patent
Bigos

(10) Patent No.: US 11,080,922 B2
(45) Date of Patent: Aug. 3, 2021

(54) SYSTEM AND METHOD OF 3D PRINT MODELLING

(71) Applicants: Sony Interactive Entertainment Inc., Tokyo (JP); Sony Interactive Entertainment Europe Limited, London (GB)

(72) Inventor: Andrew James Bigos, Staines upon Thames (GB)

(73) Assignees: Sony Interactive Entertainment Inc., Tokyo (JP); Sony Interactive Entertainment Europe Limited, London (GB)

(*) Notice: Subject to any disclaimer, the term of this patent is extended or adjusted under 35 U.S.C. 154(b) by 0 days.

(21) Appl. No.: 16/652,463

(22) PCT Filed: Nov. 7, 2018

(86) PCT No.: PCT/GB2018/053229
§ 371 (c)(1),
(2) Date: Mar. 31, 2020

(87) PCT Pub. No.: WO2019/102180
PCT Pub. Date: May 31, 2019

(65) Prior Publication Data
US 2020/0234486 A1    Jul. 23, 2020

(30) Foreign Application Priority Data
Nov. 22, 2017 (GB) .................................. 1719403

(51) Int. Cl.
*G06T 15/08* (2011.01)

(52) U.S. Cl.
CPC .......... *G06T 15/08* (2013.01); *G06T 2210/56* (2013.01)

(58) Field of Classification Search
None
See application file for complete search history.

(56) References Cited

U.S. PATENT DOCUMENTS

| 7,317,456 B1 * | 1/2008 | Lee | .......................... G06T 15/08 |
| | | | 345/427 |
| 7,509,241 B2 * | 3/2009 | Guo | .......................... G06T 17/05 |
| | | | 703/2 |

(Continued)

FOREIGN PATENT DOCUMENTS

| EP | 3035291 A1 | 6/2016 |
| EP | 3064257 A1 | 9/2016 |

(Continued)

OTHER PUBLICATIONS

International Search Report and Written Opinion for corresponding PCT Application No. PCT/GB2018/053229, 15 pages, dated Feb. 1, 2019.

(Continued)

*Primary Examiner* — Robert J Craddock
(74) *Attorney, Agent, or Firm* — Matthew B. Dernier, Esq.

(57) ABSTRACT

A method of generating a model for 3D printing, includes selecting a target object within a virtual environment; sampling the target object to form a point cloud, the point cloud comprising points corresponding to an outer surface of the target object and also one or more internal features of the target object; rendering the point cloud from a plurality of viewpoints using voxels in place of the points in the point cloud; detecting which voxels and hence which points of the cloud were rendered over the plurality of renders; forming a surface-only point cloud comprising those points of the cloud that were rendered; and generating a model for 3D printing based on the surface-only point cloud.

15 Claims, 9 Drawing Sheets

(56) References Cited

U.S. PATENT DOCUMENTS

2015/0134095 A1    5/2015  Hemani
2016/0259866 A1*  9/2016  Bigos .................... B33Y 50/00
2016/0345858 A1*  12/2016  Tromberg ............ A61B 5/1128
2017/0053438 A1    2/2017  Huang

FOREIGN PATENT DOCUMENTS

EP        3086291 A1    10/2016
JP        2015104573 A    6/2015

OTHER PUBLICATIONS

Combined Search and Examination Report for corresponding GB application No. GB 1719403.6, 5 pages, dated May 16, 2018.
Communication Pursuant to Article 94(3)EPC for corresponding EP Application No. 18804065.3, 4 pages, dated May 27, 2021.

* cited by examiner

SYSTEM AND METHOD OF 3D PRINT MODELLING

BACKGROUND OF THE INVENTION

Field of the Invention

The present invention relates to a system and method of 3D printing.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present invention relates to a system and method of 3D printing for the creation of physical models from elements of videogames, or more generally virtual environments, which have not been created specifically with 3D printing as a priority, or potentially as a factor for consideration at all.

Most modern games operate in 3D within a virtual space, and populate that space with in-game assets constructed from mesh and texture data. Typically there will be a mixture of static and dynamic elements in the resulting virtual environment, and often the dynamic elements clash or intersect with each other or other parts of themselves as they move.

This may occur when a user's character is animated to bend down to pick up an object, for example, and can result in meshes from the torso and hips to overlap. This may also occur when a user's character holds objects of different sizes, particularly if the user's character is customisable (for example in terms of size) whilst the held object is not.

Similarly, static assets may intersect or overlap when re-used to create variety within a game, for example when repositioned or re-scaled to create a variety of houses, or trees or the like.

This overlap is typically not a problem when rendering the game, because only the surfaces of the virtual environment closest to the virtual camera used for rendering a view point are selected for rendering, and any obscured or clipped elements of the virtual models are not considered further (so-called z-culling).

However, if the resulting virtual environment (or a part of it) is exported for 3D printing, then these intersecting elements can create closed voids within a model within which printing material may be trapped, both adding to the cost of making the model and also potentially making it unbalanced.

However, it is not straightforward for an automated system to select what elements of the model should or should not be printed.

The present invention seeks to address or mitigate this problem.

SUMMARY OF THE INVENTION

In a first aspect, a method of generating a model for 3D printing is provided in accordance with claim 1.

In another aspect, an entertainment device is provided in accordance with claim 10.

In another aspect, server is provided in accordance with claim 14.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of 3D print modelling are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an embodiment of the present invention, an entertainment device is operably coupled to a 3D printer. The entertainment device is arranged in operation to capture snapshots of one or more elements of a videogame for replication by the 3D printer, as explained later herein.

Entertainment Device

An example of a suitable entertainment device is the Sony® PlayStation 4® device.

Figure 1:
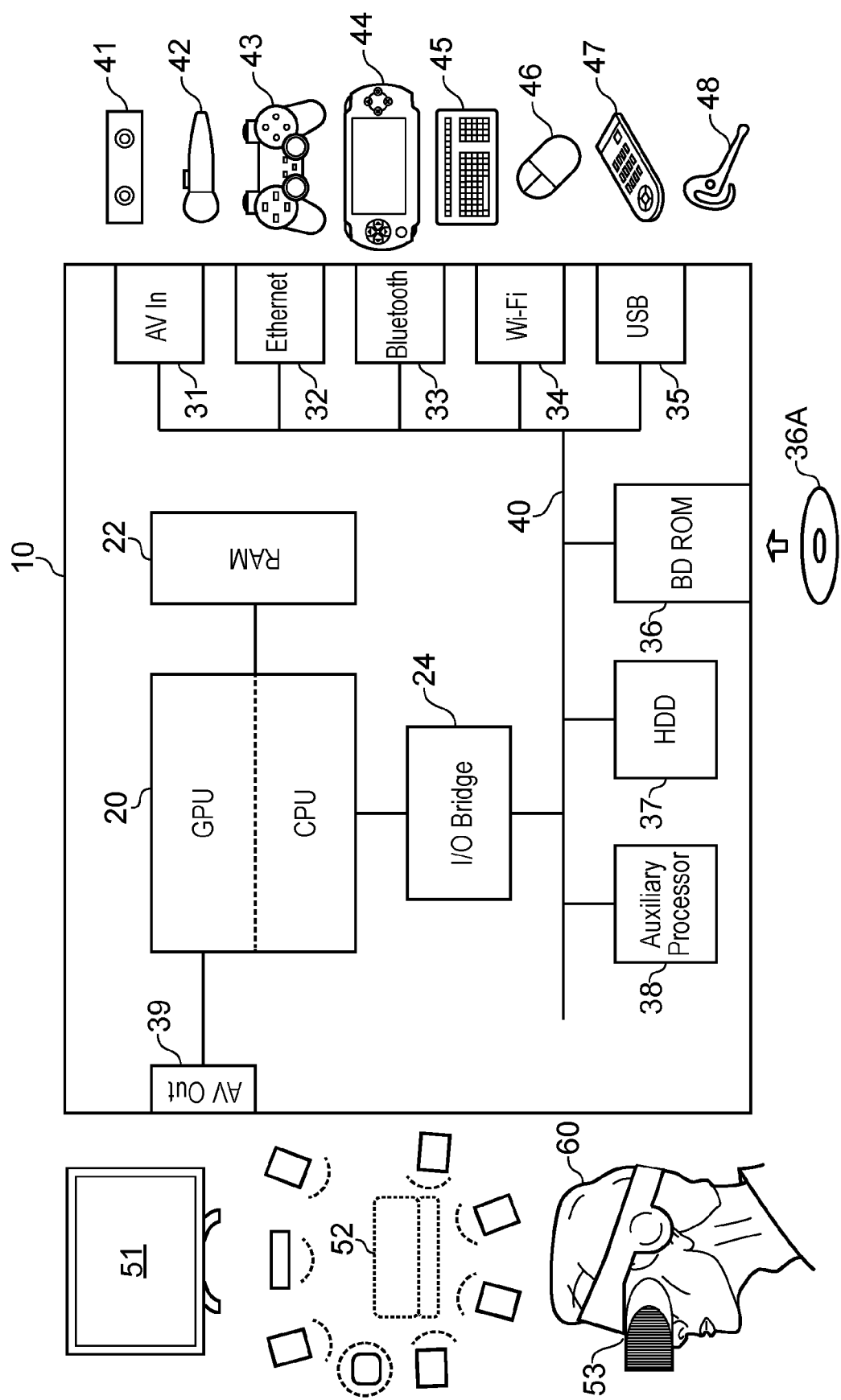
FIG. 1 is a schematic diagram of an entertainment device in accordance with embodiments of the present invention.

Referring now to the drawings, wherein like reference numerals designate identical or corresponding parts throughout the several views, FIG. 1 schematically illustrates the overall system architecture of the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye® or PS Camera®; wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a phone or tablet, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60. The head mounted display unit may have integral headphones, attachable headphones/earbuds, or rely on separate audio being supplied to the user.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content. 3D Printer As was noted previously, the entertainment device is operably coupled to a 3D printer.

It will be appreciated that there are numerous technologies for 3D printing that are typically differentiated by how layers are built up to create a model. One technology is known as selective laser sintering (SLS), where a layer of powder is selectively fused together by a laser to create solid regions; a new layer of powder is then placed on top and the process repeats to build the model. Another technology is known as stereolithography, and uses a photo-reactive liquid in conjunction with one or more lasers to harden the liquid at defined points, thereby building the model, again typically in layers. Whilst both of these techniques are envisaged within the scope of embodiments of the present invention, they have the disadvantage of requiring both powerful lasers and large volumes of matrix material in the form of powder or liquid around the model, which make them less practical for domestic use. Consequently a preferred technology is fused deposition modelling (FDM). This approach melts plastic in a printer head that moves over successive layers of the model, depositing droplets of plastic at selective positions in each layer in a manner similar to the deposition of droplets of ink by an inkjet printer on a sheet of paper. This avoids the need for lasers or a surrounding matrix of the raw material used by the model. Accordingly for the purposes of understanding an FDM 3D printer is briefly described herein with reference to FIGS. 2A and 2B.

Figure 2A:
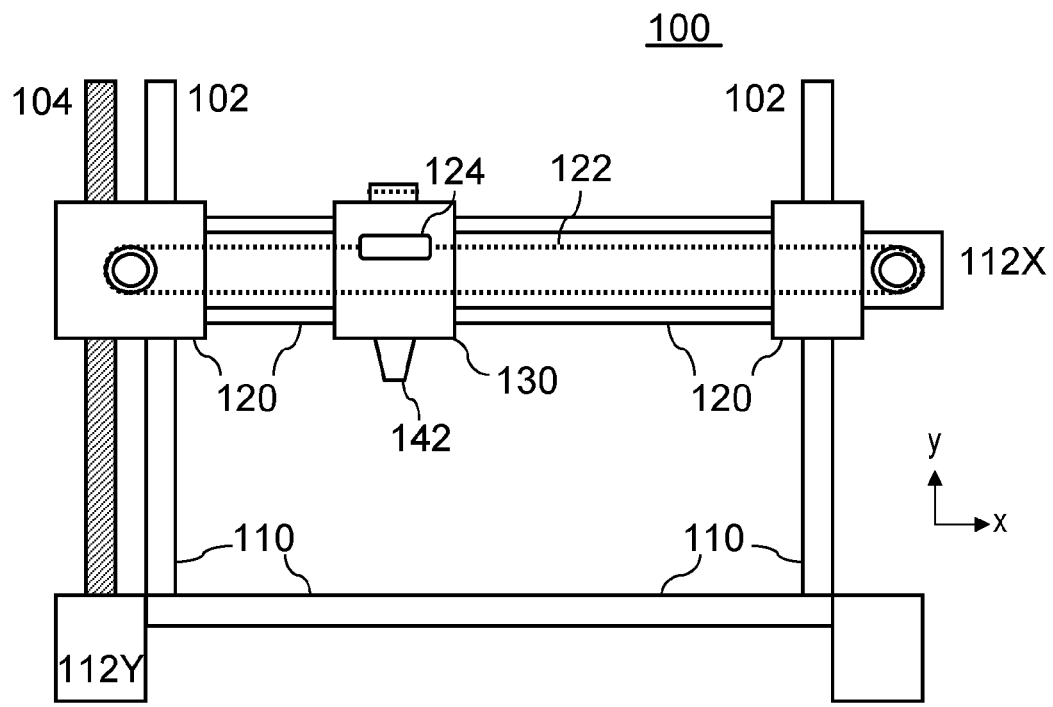
FIG. 2A is schematic diagram of a side elevation of a 3D printer in accordance with embodiments of the present invention.
Figure 2B:
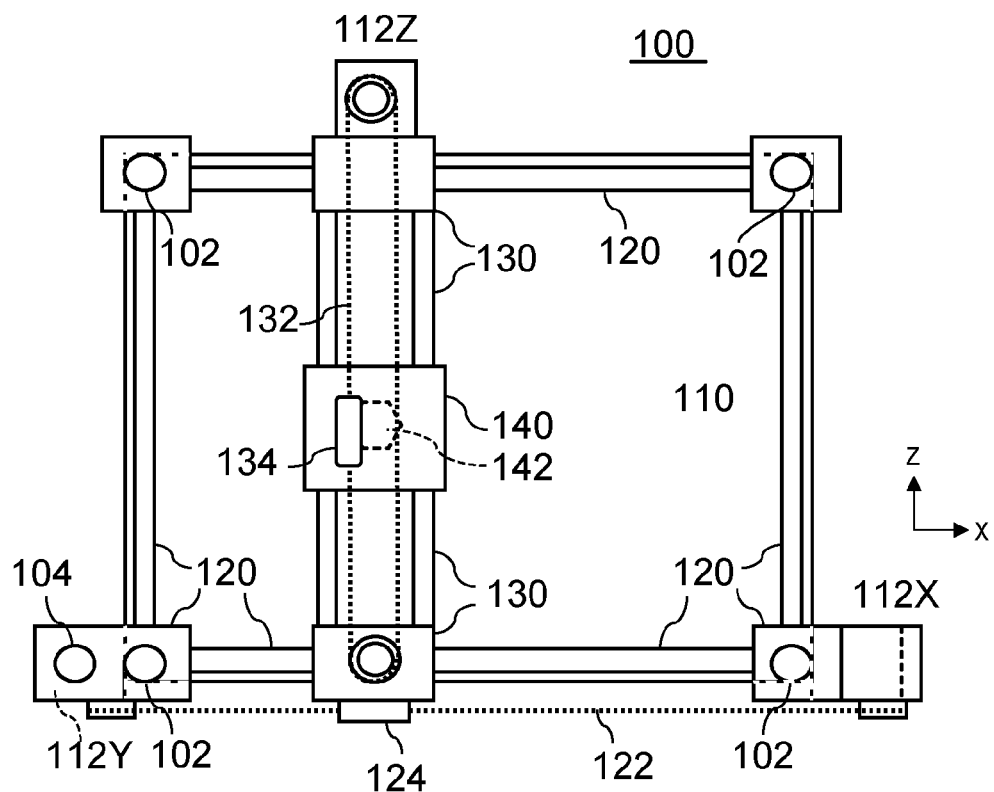
FIG. 2B is schematic diagram of a plan view of a 3D printer in accordance with embodiments of the present invention.

FIG. 2A shows a side elevation of a simple FDM 3D printer 100, whilst FIG. 2B shows a plan view of the same FDM 3D printer. The printer 100 comprises a base structure 110 that provides a working surface for assembly of the printed model and support struts 102 upon which a printer frame 120 can be raised and lowered.

In an example mechanism, a motor 112Y is coupled to a drive bar 104 comprising a screw thread; a printer frame 120 then comprises a coupling section with a threaded hole and a smooth hole, the threaded hole being engaged with the drive bar and the smooth hole being engaged with one of the support struts. When, under instruction from a printer driver, the motor 112Y turns the drive bar in a clockwise or anticlockwise direction, the printer frame is moved up or down the drive bar and support strut (i.e. along the y-axis) and hence raises or lowers a printer carriage 130 attached to it.

As can be seen from FIG. 2B, the printer frame 120 is typically mounted on four support struts 102. Optionally a second motor, drive bar and coupling section may be provided at an opposing corner of the frame, to reduce strain on the frame and the motor.

The printer frame 120 supports the printer carriage 130. A motor 112X is coupled to a drive band 122 that is fixed by fixing means 124 to the printer carriage 130. When, under instruction from a printer driver, the motor 112X rotates the drive band clockwise or anticlockwise, the printer carriage 130 is moved right or left along the printer frame 120 (i.e. along the x-axis) and hence moves an attached printer mechanism 140 laterally.

The printer carriage 130 supports the printer mechanism 140. A motor 112Z is coupled to a drive band 132 that is fixed by fixing means 134 to the printer mechanism 140. When, under instruction from a printer driver, the motor 112Z rotates the drive band clockwise or anticlockwise, the printer mechanism 140 is moved in or out of a depth direction (i.e. along the z-axis).

The printer mechanism 140 itself comprises heating means for heating the end of one or more plastic threads fed into the mechanism (not shown), or for heating grains of plastic powder obtained from a hopper on the mechanism (not shown). The heating of the plastic or alternatively the release of heated plastic is controlled by instruction from a printer driver. A resulting bead or droplet of melted plastic is then deposited onto the working surface 110 of the printer or a partially built model (not shown) as applicable, through the printer head or nozzle 142.

In this way, under suitable instruction from a printer driver, the printer head can be positioned anywhere within a working volume of the 3D printer using motors 112X, Y, Z, and a droplet of plastic can be deposited at that position, which then cools and hardens to form a voxel of a 3D model. Through successive movement of the printer head and selective melting or release of plastic droplets, a completed 3D model can thus be built from a plurality of such voxels.

Typically the printer driver itself is a software module in a computer-aided design system that receives model geometry describing the 3D model. The printer driver then generates thin slices of the 3D model one voxel thick for each layer in the y direction, and determines the x, z coordinates for each voxel in that layer. The printer driver then outputs a sequence of instructions to the printer 100 to move the printer head 142 to the respective x, z coordinate for each voxel in layer y, where the printer mechanism is instructed to heat and/or release a droplet of plastic to form a voxel at that position. In this way the digital 3D model is rebuilt as a physical model by the 3D printer.

In an embodiment of the present invention, the printer driver is incorporated into the videogame, or the operating system of the entertainment device, or a middleware library of support functions used by either the videogame or the operating system.

The Virtual Environment

Figure 3:
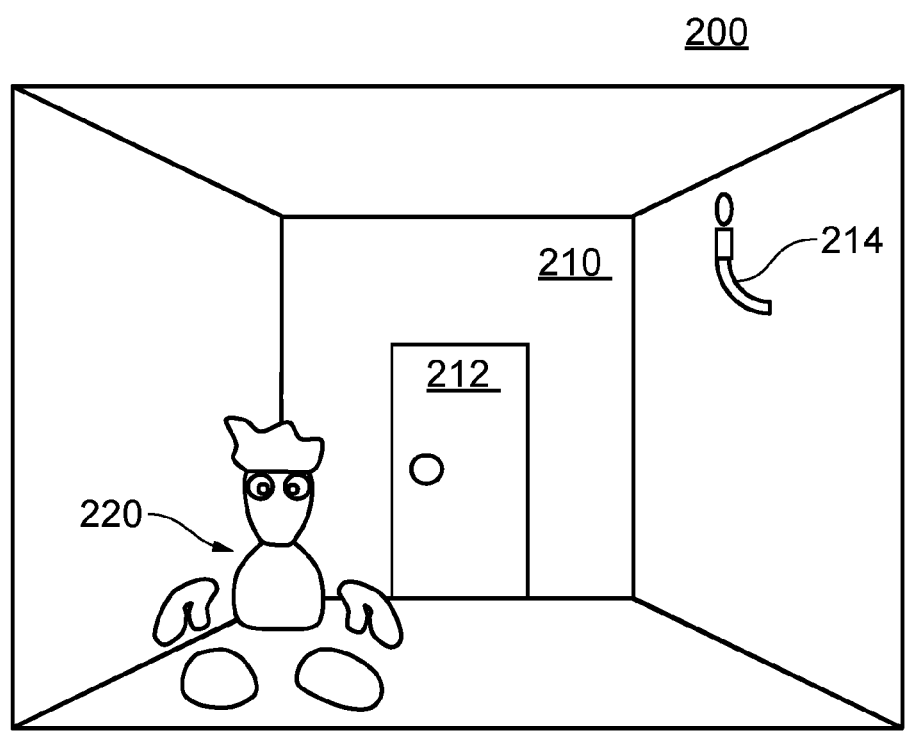
FIG. 3 is a schematic diagram of a videogame virtual environment in accordance with embodiments of the present invention.

Referring now to FIG. 3, a videogame running on the entertainment device comprises a virtual environment in which typically a plurality of entities or environmental elements are dynamically viewed as the user changes the position of viewpoint and as entities or elements of the game enact scripted activities or react to the user's behaviour, or a mixture of both.

In FIG. 3, a simple environment 200 is illustrated comprising a room 210 with a door 212; on one wall there is mounted a candle in a candleholder 214. In the room is the player's character 220 (here illustrated for example by the fictitious game character Blobman).

The virtual environment is constructed in 3D from geometry data, typically in the form of polygons defining a surface of an object. These polygons may be predefined for example in the case of static objects and background scenery, or may be warped/repositioned or procedurally generated in the case of mobile entities within the environment such as the player's character. It will be appreciated that references herein to 'polygons' encompasses preliminary geometrical features such as vertices, from which polygons are built, where these are used in the graphics pipeline. Similarly, voxel rendering uses equivalent geometric features to describe objects. Hence processes described as applying to polygons may be applied in whole or part to such other geometrical features as appropriate.

The virtual environment is then prepared for presentation to the user from a selected viewpoint. Elements of the environment that have line of sight to the user are patterned with texture information appropriate to the object they represent, and the textured geometry is further processed for lighting effects, such as variations in brightness from virtual light sources, and bump mapping (or similar techniques such as displacement mapping or use of an isosurface) to simulate how the texture should interact with such a virtual light source. Additionally other effects such as volumetric fog and particle effects may be included.

The final rendered image is then presented to the user, typically via a 2D or 3D television or via a head mounted display.

Often within such games, the user has an experience that they wish to share with friends and/or the wider world. To this end, as noted previously an entertainment device such as the PlayStation 4 ® can have a 'share' button on its controller to facilitate a capture of the image presented to the user, which can then be uploaded to a sharing site such as a social media site.

Obtaining a Model for 3D Printing from the Virtual Environment

In an embodiment of the present invention, the user is provided with the option to select a moment within the game from which to create a 3D printed model. In this way, the user can create tangible mementos of their in-game experiences.

In an embodiment of the present invention, when the entertainment device receives an input indicating that a user wishes to create a 3D print of the current scene, the game state is frozen (e.g. paused) so that it can be analysed for 3D printing.

It will be appreciated that for a game, many visible features are not inherent in the in-game geometry or textures of a model alone. For example the in-game geometry, which may be a mix of polygons and skeletal models, may have physics effects such as positioning and deformation applied from frame to frame. Other rendering effects like procedural effects and parametrised models may be done in shaders during rendering. Meanwhile shaders may also visually process textures according to bump maps and the like. Consequently often the final scene—as viewed by the user—is only combined in one place, and in one format, when it is rendered for display on screen.

Consequently, in an embodiment of the present invention, a 3D model is constructed for 3D printing using a representation of these rendered images internal to the entertainment device, in preference to the potentially disparate internal in-game representations of the virtual environment geometry, textures etc.

Figure 4A:
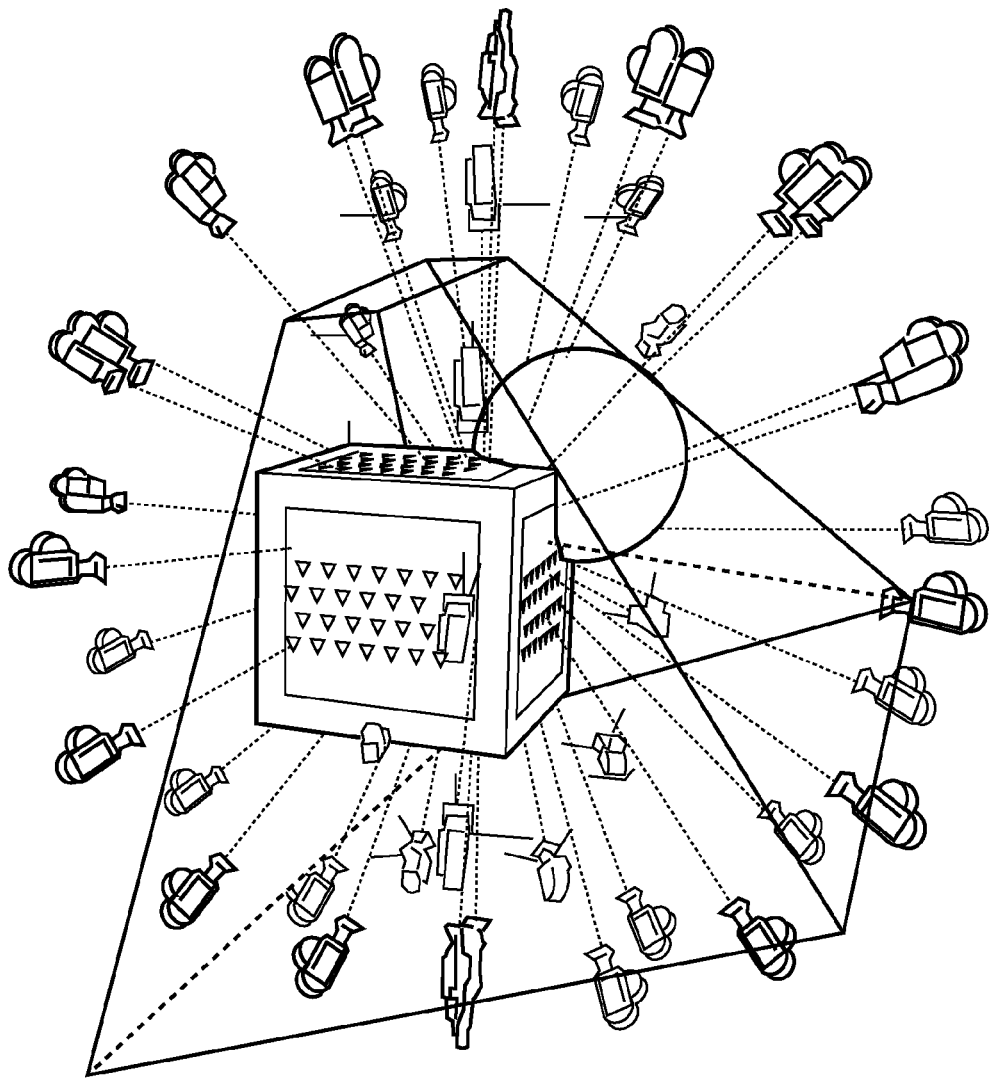
FIGS. 4A-B are schematic diagrams of a virtual photogrammetry scheme.

Referring now to FIGS. 4A-D, in principle this may be achieved by a technique that may be referred to as virtual photogrammetry, in which while the game state is frozen, the entertainment device generates a plurality of rendered images of the virtual environment from different viewpoints (as shown in FIG. 4A), and the rendered images from these viewpoints are stitched together to create a shell resembling the virtual environment. More commonly, but not necessarily, this process is applied to only one or a subset of objects selected from within the virtual environment, such as a user's avatar, an in-game opponent, or the two of them together.

Figure 4B:
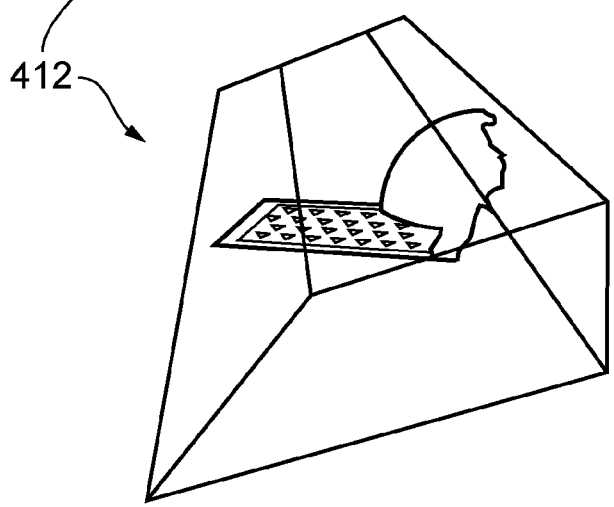
Figure 4C:
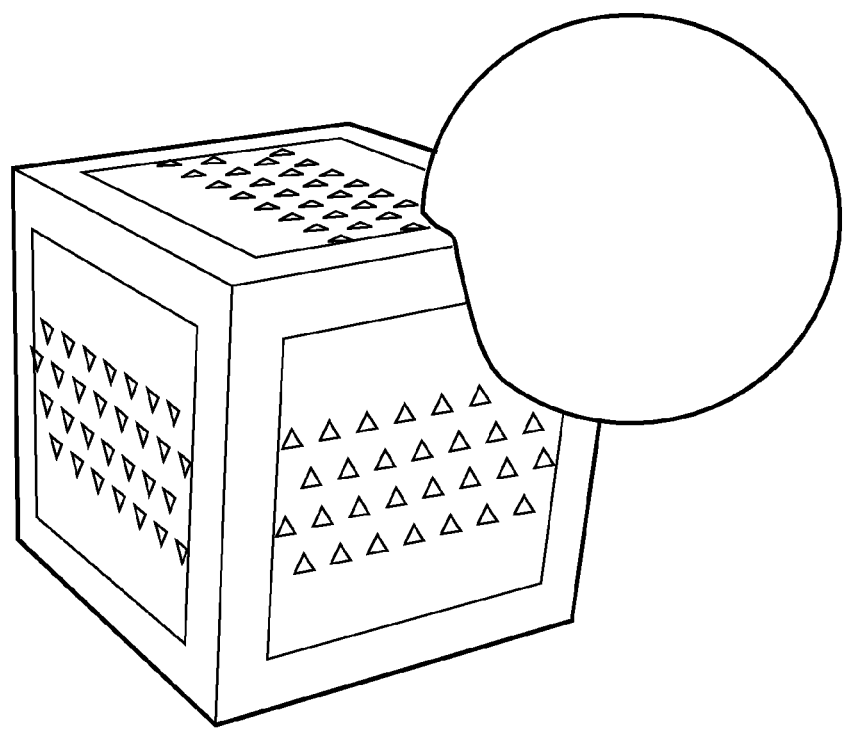
FIGS. 4C-D are schematic diagrams of the results of the virtual photogrammetry scheme.
Figure 4D:
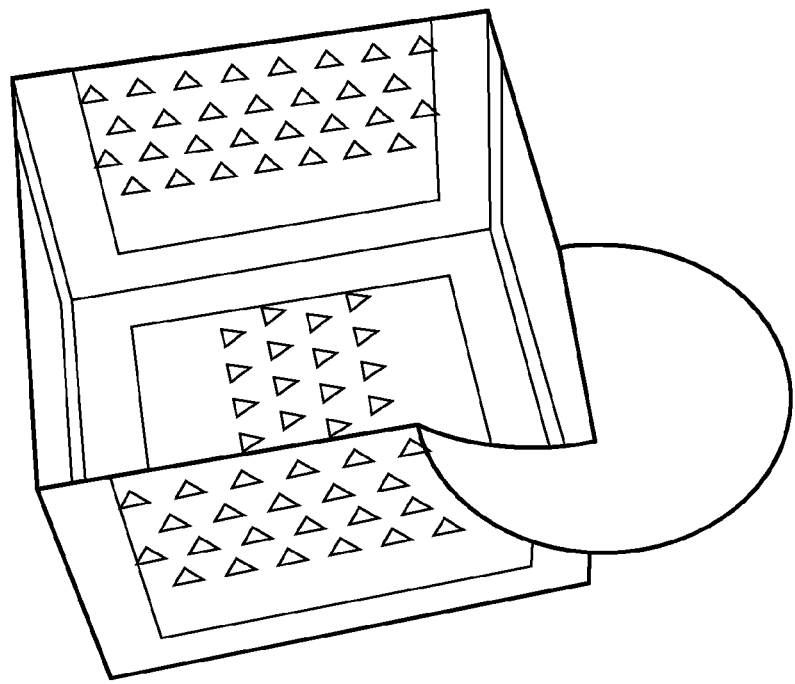

An issue with this technique, as illustrated by FIG. 4B (which shows the render by a camera 410 having view 412), is that the device must therefore render the scene or the or each object from a large number of positions (typically in the order of 100) at the point of request in order to capture the renders needed to generate the complete shell (FIG. 4C, and shown in cut-away in FIG. 4D).

It will be appreciated that this can generate a large amount of data whilst the entertainment device is already running a videogame that itself may be utilising most of not all of the memory available to the entertainment device. Consequently the entertainment device may either become unstable, or need to page data out to its permanent storage, which greatly reduces the effect of speed of the operation. A faster and more stable approach would be desirable.

Accordingly, in an embodiment of the present invention, a point cloud may be sampled from the internal model of the virtual environment. A point cloud samples the colour/brightness, position and optionally normal direction data for a plurality of points corresponding to a target object or objects within the virtual environment. Noticeably this can be done before the final render stages have resulted in z-culling of data, and so those parts of the object not directly visible to the user from the current viewpoint of the virtual camera can also be captured. Because the point cloud is captured without z-culling, is no longer necessary to render the or each object in large number of times to capture a model of the target object or objects.

Of course, it will be appreciated that optionally the point cloud data can be supplemented by rendering from a plurality of viewpoints in a similar manner to the virtual photogrammetry above in order to capture any change to colours/brightness etc., due to final stage rendering effects, but this may be done for example using only a handful of viewing positions to capture the overall effect, but it is not necessary to ensure that every single pixel of the target object is captured in a render.

Hence advantageously a point cloud enables a sampling of position, appearance and optionally direction data for the object at a potentially large plurality of points without necessarily rendering the object a large number of times at the moment of capture.

However, this approach generates a new problem in turn.

Hidden Point Removal

The advantageous feature of point cloud sampling, namely that data points from a target object or objects are collected without z-culling and thereby avoid the need for a large number of renders as part of the initial capture process, also has a disadvantage.

Referring back to the object in FIG. 4A, this shows a compound object constructed from an intersecting circle and cube. The object looks like a single object with a unified surface due to z-culling during its render, and indeed this is the result obtained using virtual photogrammetry as shown in FIGS. 4C and 4D.

Figure 5:
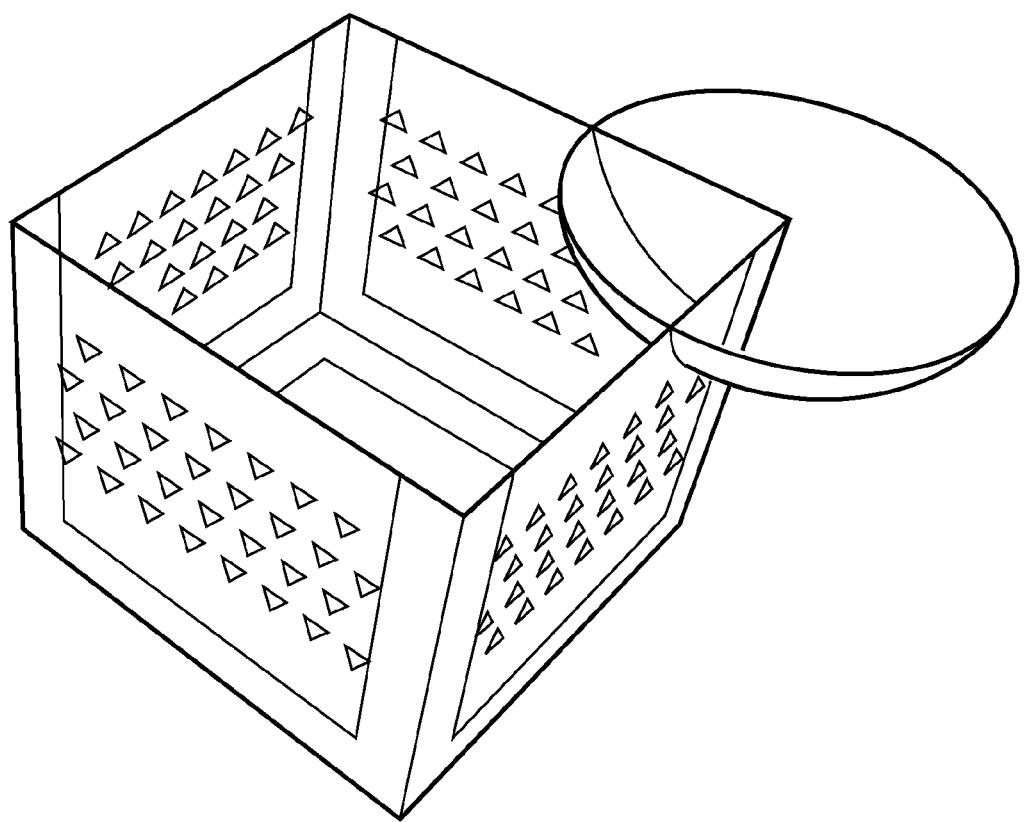
FIG. 5 is a schematic diagram of the results of a point cloud sampling scheme.

However it will be appreciated that within the virtual environment in fact one corner of the cube is located inside the wall of the sphere. Because point cloud sampling does not use z-buffering, this internal corner of the sphere is also captured, as shown in the cutaway view of the object in FIG. 5.

Consequently, a 3D printed model of this compound object created based upon a point cloud sampling of this kind would comprise a corner of the cube inside the sphere, where it would never be seen. Similarly, a portion of the sphere also exists inside the cube, and together they create a closed void. Consequently, depending on the printing technology used, this closed void could retain a considerable weight of printing material, trapped between the corners of the cube and the wall of the sphere.

Consequently, a technique is now provided to remove hidden points from such a point cloud.

In an example embodiment it could be envisaged that at an appropriate time when there are sufficient processing/memory resources available entertainment device (which may be at the time of capture, but will typically be at a subsequent time, for example when using a 3D printing preview application after the user has finished playing the game from which the point cloud sample of their target object or objects was taken), the above-described photogrammetry technique could be applied to the samples in the point cloud.

As per the previously discussed photogrammetry technique, the renders from the plurality of virtual cameras would result in a shell, that, in a manner similar to the cut-away view of the object in FIG. 4B, does not comprise any hidden surfaces.

However, this approach is inefficient, as it is still undesirable to have to store a potentially large number of renders and subsequently assemble them, as this may still compromise or limit the resources available for normal operation of the entertainment device, and/or may take an unduly long amount of time to perform.

Consequently in an embodiment of the present invention, a hidden point removal technique instead counts which points in the point cloud correspond to a rendered point (or would correspond to a rendered point in a completed render, once z-culling or its equivalent has been completed for a given render), and then only retain those points of the point cloud for which at least one count was recorded over the plurality of renders or partial renders performed.

Using this technique, the results of each render or partially performed render do not need to be stored, only the count in relation to the points in the point cloud.

Figure 6:
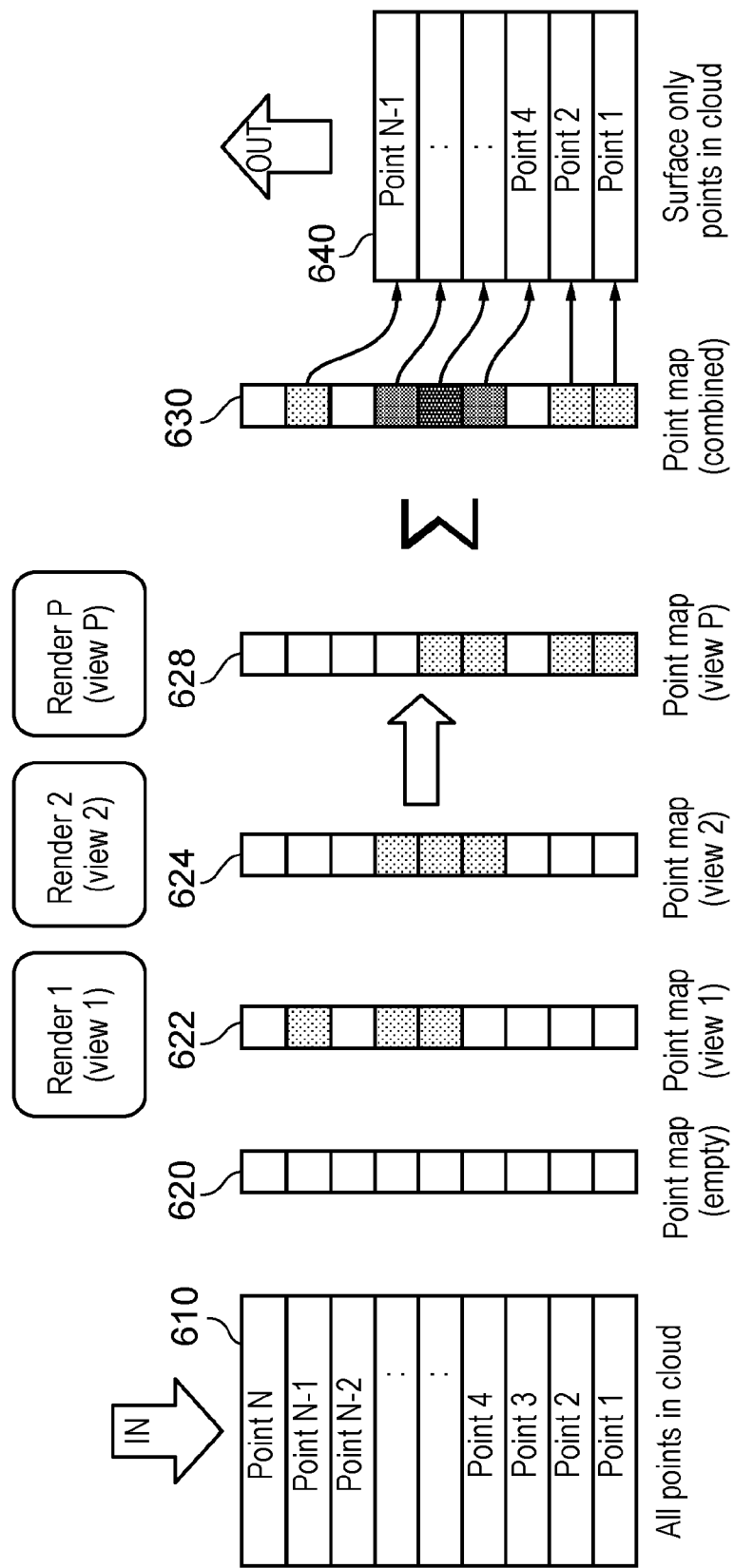
FIG. 6 is a schematic diagram of a point cloud sampling scheme in accordance with an embodiment of the present invention.

Hence referring now to FIG. 6, a table 610 of all recorded points in the cloud is assembled, together with a so-called point map 620, being a list of counters or flags, one for each point in the table. Initially this point map is empty (i.e. all flags are false, or all counters are zero).

In one embodiment, a new point map (622, 624, 628) is created for each of P renders, where each of the P renders is from a different virtual camera position, in a manner similar to the photogrammetry technique described previously herein. When a point is rendered, its corresponding position on the point map is flagged 'true' or incremented, depending on the type of point map chosen.

Once all P renders have been completed, then if the point maps are flags a simple logical OR operation across the maps will identify any point that was rendered at least once. Alternatively where the point maps are counters then a summation across the maps will identify how many times any point was rendered, out of a maximum of P times.

It will be appreciated that alternatively only a single point map may be provided that is used for successive renders. In this case when a point is rendered, its corresponding position on the point map is updated.

For a flag-style point map, the corresponding position is flagged 'true', but is not reset to false between renders. Meanwhile, points that are not rendered are not updated on the point map at all. Hence over the course of the P renders, any point that is rendered will be flagged and remain 'true'.

For a counter-style point map, the corresponding position value is incremented by 1, and is not reset between renders so that positions on the point map accumulate values to form a point histogram.

Optionally the histogram can be subsequently interrogated to determine areas of the model with low coverage (e.g. only captured in one render), and which may benefit from an additional rendering from a different position and/or direction to those already performed. Similarly, optionally points in the point cloud that have a histogram value of zero but are physically adjacent to a point whose histogram only has a value of 1 (or optionally, 2, 3, 4 or 5 depending on designer choice), may have their histogram value changed to a 1 as well. This can server to patch small holes and occlusions in the model, without letting any hidden points propagate more than a single point in depth into the model. Indeed, more complex analysis may be used to determine which points belong on a continuous surface, and interpolate or fill in values for points with zero values that are completely surrounded by points with positive values, for up to an area of zero-value points determined by the designer.

Whether a flag-style point map or a counter-style point map is used, the final result will be a combined point map 630 that indicates which points were never rendered (being either false, or having a count of zero), optionally after gap-filling as discussed above. These un-rendered points are then not transferred to a new surface-only point cloud 640 (or equivalently are deleted from the existing point cloud).

In this way, hidden points in the point cloud can be effectively removed.

Rendering the Point Cloud

Rendering the point cloud, or implementing part of the rendering process for the point cloud, can also generate a further problem in turn.

The points in the point clouds are dimensionless, and simply define a position, colour/brightness values (e.g. RBG or other colour space values), and optionally a normal value indicating the intended surface direction.

However, this means that the point cloud itself is simply a sparse matrix (or, indeed, cloud) of points, and a conventional renderer, even using z-culling, would generate a render in which hidden points are visible in the gaps between surface points.

Figure 7:
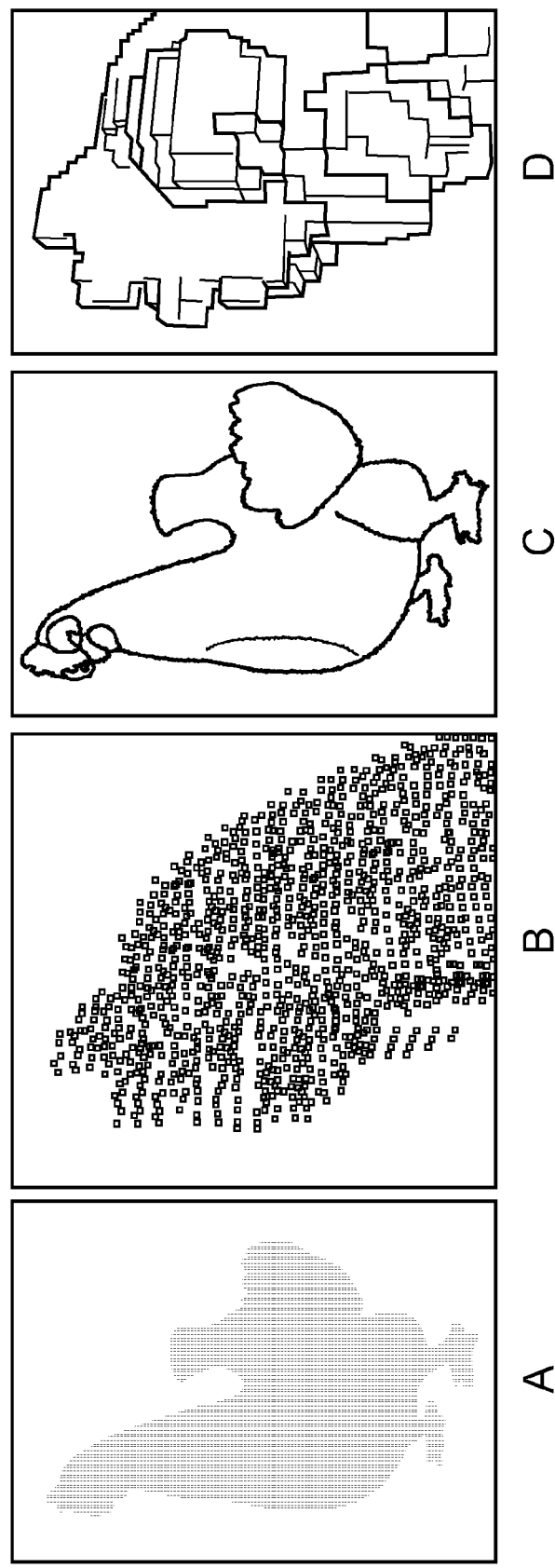
FIGS. 7A-B illustrate the results of a rendering scheme.
FIGS. 7C-D illustrate the results of a rendering scheme, in accordance with an embodiment of the present invention.

This is illustrated by the point cloud render shown in FIG. 7A, and in close-up in FIG. 7B, where, for example, the complete sphere of each eyeball of the chicken can be seen and hence the contributing points of those spheres would all get a flag or increment.

Accordingly, in an embodiment of the present invention, each view of the point cloud is rendered in voxels, with the voxel size preferably being equal to the sampling pitch (inter-sample distance) of the point cloud itself. In this way, the voxels fill in the gaps between the points, preventing visibility of internal features of the model, as desired.

This is illustrated by the point cloud voxel render shown in FIG. 7C, and in close-up in FIG. 7D, where, for example, now only the closest part of the outer surface of each eyeball of the chicken can be seen, and hence the only the desired points of the cloud would all get a flag or increment.

It will be appreciated that 3D printing effectively uses voxels. Hence in an optional embodiment of the present invention, the intended size of the 3D model and the voxel pitch of the intended printer can be used to select the point cloud sample pitch and hence the voxel size used in rendering, so that there is an integer (and preferably 1:1) ratio between the voxels in the render and the voxels in the 3D print.

Alternatively, the point cloud may be of a pitch density that allows subsampling to a lower pitch resolution corresponding to an integer multiple of the voxels in the eventual 3D model, and preferably 1:1.

Information about the intended printer may be provided by a printer driver, if the printer is a local peripheral device, or by data supplied by a remote 3D printing service in a format recognised by the entertainment device when implementing this technique.

It will however be appreciated that it is not essential to supply a voxel model to a 3D printer, and that alternatively a mesh may be constructed from the surface-only point cloud 640 for printing purposes (e.g. for export to a 3D printing editor or converter that is arranged to accept meshes rather than voxels).

Other Issues

Clipping—If the rendering process utilises existing rendering code, then it may be necessary to maintain more than a predetermined minimum distance from the target object in order to avoid so-called near clipping, where parts of an object too close to the position of the virtual cameral are omitted from the render. It will be appreciated that if this was to occur, then it would reveal the internal structures of the target object that the present embodiments seek to avoid.

Camera Positioning—A spherical distribution of cameras, as seen in FIG. 4A, typically provides a good all-round view of an object. However, it can be assumed that the most common object to be captured using the present techniques will be an avatar of the user, and hence will be human or humanoid and hence also typically have a predominant axis (i.e. be taller than they are wide). As a result, some surfaces of such an avatar may be under-sampled using a spherical camera distribution.

Meanwhile an alternative cylindrical distribution may provide better coverage on the long axis of the avatar, but provides relatively poor coverage of the top and bottom.

Consequently, in an embodiment of the present invention a combination of these camera distributions may be used, to form a so-called lozenge distribution, with sampling positions distributed on a notional surface formed of a cylinder capped with opposing hemispheres. The cylinder can be arranged vertically within the virtual space occupied by the point cloud, or optionally a centreline (i.e. a major axis) of the point cloud may be determined, and the cylinder can be oriented to share this centreline. Further optionally, the height or length of the cylinder may be set to be substantially the same length as the object/point cloud along the major axis, so that the cylinder terminates substantially at each end of the cloud on the centreline, and is then capped by the opposing hemispheres that primarily capture the top and bottom of the object/point cloud.

It will also be appreciated that the notional sphere, cylinder or lozenge surface is a solid of rotation about a centreline (whether that centreline is arbitrary, vertical or responsive to a major axis of the object/point cloud). Hence in principle a distribution of cameras may be placed on a plane that centrally intersects such a surface and follows the centreline if there is one, the cameras being positioned lying on the perimeter of the surface (in other words, marking out a silhouette of the notional shape) and facing inwards toward the object/point cloud, perpendicular to the perimeter. Then either the plane, the object/point cloud, or both, may be rotated with respect to the other so as to generate samples that effectively populate the surface of the shape with respect to the object/point cloud.

Re-Rendering—As noted previously, the combined histogram or point map 630 can represent a count of how many times each point in the point cloud was rendered. This histogram can be used to identify those points in the surface only cloud that were rendered fewer than a predetermined number of times.

For those points, additional renders with a virtual camera close to the points' positions may be used to improve coverage. In this case 'close' may for example mean the shorter of a distance to the notional surface on which other cameras are placed, and the distance to another external surface of the target object the lies between the point and a candidate camera position on the notional surface. Optionally normal data associated with the points may be used to confirm what direction an intersecting surface is facing (to distinguish between opposing external surfaces that ideally should both be sampled and a surface inside another surface, where the inside surface ideally should not be sampled).

Alternatively or in addition, the point maps may be used to determine which camera positions successfully rendered those points, and additional virtual camera positions may be chosen close those earlier camera positions, and/or on a path between those earlier positions. In this case 'close' may for example mean any position between two camera positions that successfully cause that point to be rendered, or may mean a position between a camera that successfully caused that point to be rendered and one that did not; hence more generally 'close' can be taken to mean within the mean distance between cameras of a camera that successfully caused that point to be rendered.

Model Fixing—As noted previously, techniques for filling in gaps in the model, such as point cloud interpolation, or voxel dilation, may be used. Similarly, the resulting shell of voxels may be thickened by growing the shell inwards by N voxels, so as to provide adequate structural strength to the model. The value of N may depend on the material being used for the model, its size, cost, shape, and centre of gravity, among other considerations, and may vary locally (for example, by being thicker nearer the base, which may carry more weight than the top). A corresponding thickness parameter T may be provided for a mesh model, with similar considerations and variability.

Processing Location—Whilst the point cloud capture occurs at the entertainment device, as noted previously an advantage of this process is that the subsequent renders or partial renders can occur later, and hence potentially independently of the game/application within which the target object was sampled.

Consequently, it is also possible for the point cloud data to be sent to a server, for example a server administered by the game developer or the producers of the entertainment device, and the server can process the point cloud to generate the surface-only point cloud 640 and thereafter either a voxel or mesh model for 3D printing and/or preview.

Moreover, this may be done by the server whilst the user continues to play the game/application from which the target object was sampled; consequently the resulting surface cloud, voxel model or mesh model may be downloaded back to the entertainment device and presented to the user once their game session is paused or complete, or the user may themselves choose to access the results either at the server or as downloaded to their entertainment device.

Printing—As noted previously, it may be possible to print directly from a voxel model if a local or remote printer supports this. Otherwise, either a mesh model may be generated from the surface only point cloud, or may be generated by converting the voxel model. In either case the model may be evaluated for integrity (e.g. no gaps) and may be displayed for inspection by the user and/or a service provider operating a remote printer. Optionally the model may be manually edited at this stage for any reason (for example to deliberately create a drainage hole at a suitable position, if the 3D printing technique would leave raw material inside the model otherwise).

Figure 8:
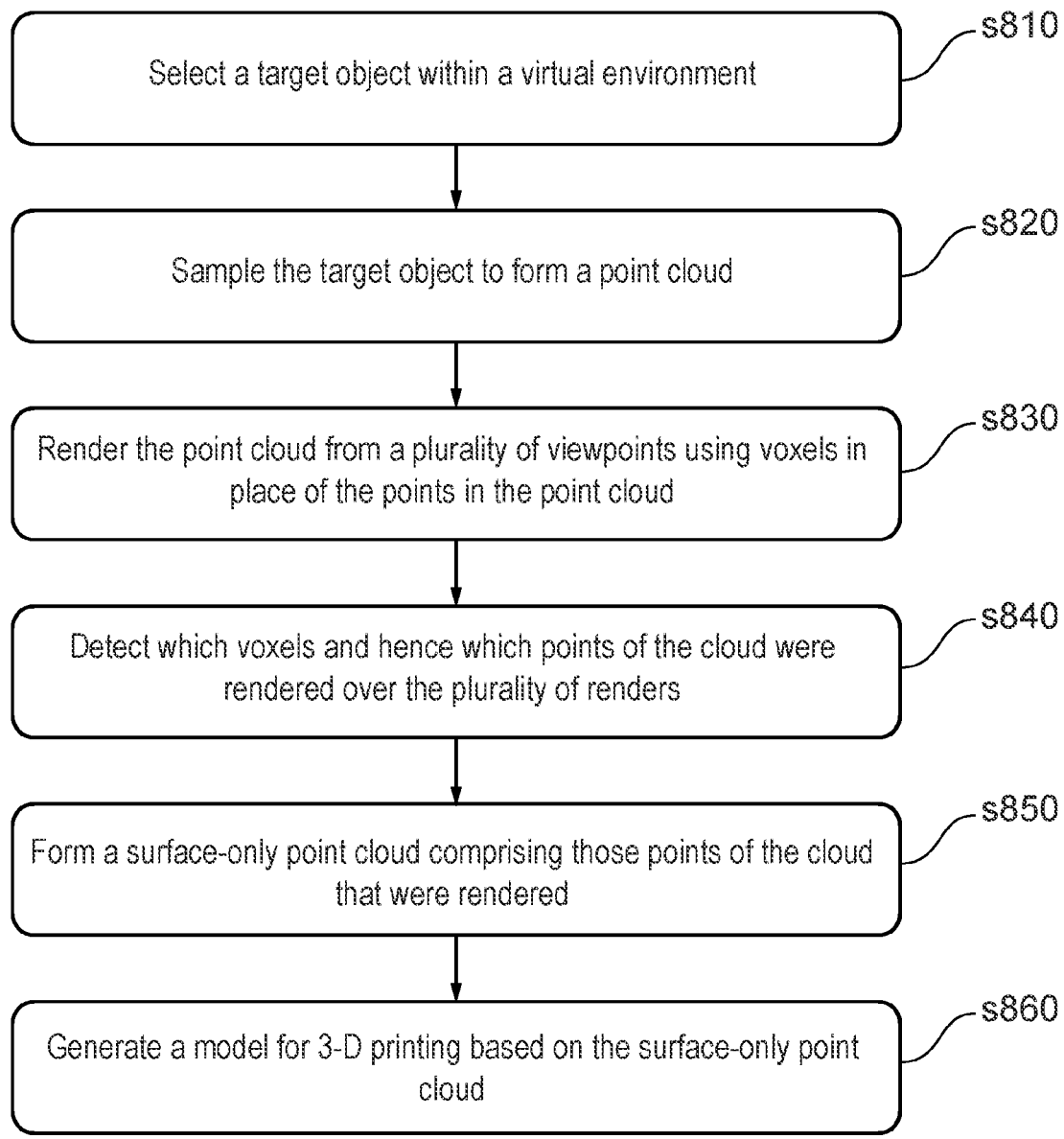
FIG. 8 is a flow diagram of a method of generating a model for 3D printing, in accordance with an embodiment of the present invention.

Referring now to FIG. 8, in a summary embodiment of the present invention a method of generating a model for 3D printing comprises:

in a first step s810, selecting a target object within a virtual environment (such as that of a video game, as described previously herein);

in a second step s820, sampling the target object to form a point cloud, the point cloud comprising points corresponding to an outer surface of the target object and also one or more internal features of the target object, as described previously herein;

in a third step s830, rendering the point cloud from a plurality of viewpoints using voxels in place of the points in the point cloud, as described previously herein;

in a fourth step s840, detecting which voxels and hence which points of the cloud were rendered over the plurality of renders, as described previously herein;

in a fifth step s850, forming a surface-only point cloud comprising those points of the cloud that were rendered, as described previously herein; and in a sixth step s860, generating a model for 3D printing based on the surface-only point cloud, as described previously herein.

It will be apparent to a person skilled in the art that variations in the above method corresponding to operation of the various embodiments of the apparatus as described and claimed herein are considered within the scope of the present invention, including but not limited to:

the step of detecting which voxels and hence which points of the cloud were rendered over the plurality of renders comprising providing a point map having a corresponding data field for each point in the point cloud; and updating, for each rendered voxel, the data field corresponding to the respective point in the point cloud;

the step of updating the respective field comprising incrementing a count for that field, so that with each successive render the point map forms a histogram of overall render frequency for the points of the point cloud;

and in this case, further, the steps of identifying points of the point cloud that were not rendered during the priority of renders but which are immediately adjacent to a predetermined number of points of the point cloud that were rendered at least a predetermined number of times; and incrementing the count for the corresponding field of the point map for such identified points;

and alternatively or in addition, further, the steps of identifying points for which the corresponding count in the point map is below a predetermined number; and re-rendering the point cloud from a new viewpoint either close to at least one of the identified points, or close to a viewpoint from which the identified point was previously successfully rendered;

the step of rendering the point cloud from a plurality of viewpoints comprising selecting viewpoints distributed over a lozenge-shaped surface surrounding the target object, the lozenge shape having a cylindrical portion capped by opposing hemispherical portions; and the steps of selecting a target object and sampling the target object occuring whilst the virtual environment is being generated for another purpose; and the steps of rendering the point cloud, detecting rendered voxels, forming a surface only point cloud and generating a model for 3D printing occuring after the virtual environment is no longer being generated for the another purpose.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

In a summary embodiment of the present invention, the hardware is an entertainment device (10), comprising: an image processor (such as APU 20, CPU 2A and/or GPU 20B) adapted (for example by suitable software instruction) to generate a virtual environment; a selection processor (such as APU 20, CPU 2A and/or GPU 20B) adapted (for example by suitable software instruction) to select a target object within a virtual environment; a sampling processor (such as APU 20, CPU 2A and/or GPU 20B) adapted (for example by suitable software instruction) to sample the target object to form a point cloud, the point cloud comprising points corresponding to an outer surface of the target object and also one or more internal features of the target object; a rendering processor (such as APU 20, CPU 2A and/or GPU 20B) adapted (for example by suitable software instruction) to render the point cloud from a plurality of viewpoints using voxels in place of the points in the point cloud; a detection processor (such as APU 20, CPU 2A and/or GPU 20B) adapted (for example by suitable software instruction) to detect which voxels and hence which points of the cloud were rendered over the plurality of renders; a re-sampling processor (such as APU 20, CPU 2A and/or GPU 20B) adapted (for example by suitable software instruction) to form surface-only point cloud comprising those points of the cloud that were rendered; and a modelling processor (such as APU 20, CPU 2A and/or GPU 20B) adapted (for example by suitable software instruction) to generate a model for 3D printing based on the surface-only point cloud.

In an instance of this summary embodiment, the detection processor is adapted to provide a point map having a corresponding data field for each point in the point cloud, and update, for each rendered voxel, the data field corresponding to the respective point in the point cloud.

In an instance of this summary embodiment, the rendering processor is adapted to select viewpoints distributed over a lozenge-shaped surface surrounding the target object, the lozenge shape having a cylindrical portion capped by opposing hemispherical portions.

In an instance of this summary embodiment, the image processor, selection processor and sampling processor operate whilst the virtual environment is being generated for another purpose, and the rendering processor, detection processor, re-sampling processor and modelling processor operate after the virtual environment is no longer being generated for the another purpose.

Furthermore it will be appreciated that the above described components of the entertainment device may be adapted as appropriate by suitable software instruction is to implement any of the other methods or techniques described previously herein.

Also as noted previously, potentially the method described in relation to FIG. 8 may be distributed across several devices, with the image processor, selection processor and sampling processor operating in the entertainment device, which then proceeds to transmit the point cloud data to a remote server.

Accordingly, in a summary embodiment of the present invention, a server (not shown) comprises a receiver adapted (for example by suitable software instruction) to receive from an entertainment device (10) a point cloud, the point cloud comprising points corresponding to an outer surface of a target object and also one or more internal features of the target object, the target object having been selected from within a virtual environment generated by the entertainment device; a rendering processor adapted (for example by suitable software instruction) to render the point cloud from a plurality of viewpoints using voxels in place of the points in the point cloud; a detection processor adapted (for example by suitable software instruction) to detect which voxels and hence which points of the cloud were rendered over the plurality of renders; a re-sampling processor adapted (for example by suitable software instruction) to form surface-only point cloud comprising those points of the cloud that were rendered; and a modelling processor adapted (for example by suitable software instruction) to generate a model for 3D printing based on the surface-only point cloud.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating a model for 3D printing, comprising:
   selecting a target object within a virtual environment;
   sampling the target object to form a point cloud, the point cloud comprising points corresponding to an outer surface of the target object and also one or more internal features of the target object;
   rendering the point cloud from a plurality of viewpoints using voxels in place of the points in the point cloud;
   detecting which voxels and hence which points of the cloud were rendered over the plurality of renders;
   forming a surface-only point cloud comprising those points of the cloud that were rendered; and
   generating a model for 3D printing based on the surface-only point cloud.

2. The method of claim 1, in which the step of detecting which voxels and hence which points of the cloud were rendered over the plurality of renders comprises:
   providing a point map having a corresponding data field for each point in the point cloud; and
   updating, for each rendered voxel, the data field corresponding to the respective point in the point cloud.

3. The method of claim 2, in which the step of updating the respective field comprises incrementing a count for that field, so that with each successive render the point map forms a histogram of overall render frequency for the points of the point cloud.

4. The method of claim 3, comprising the steps of:
   identifying points of the point cloud that were not rendered during the plurality of renders but which are immediately adjacent to a predetermined number of points of the point cloud that were rendered at least a predetermined number of times; and
   incrementing the count for the corresponding field of the point map for such identified points.

5. The method of claim 3, comprising the steps of:
   identifying points for which the corresponding count in the point map is below a predetermined number; and
   re-rendering the point cloud from a new viewpoint close to at least one of the identified points.

6. The method of claim 3, comprising the steps of:
   identifying points for which the corresponding count in the point map is below a predetermined number; and re-rendering the point cloud from a new viewpoint close to a viewpoint from which the identified point was previously successfully rendered.

7. The method of claim 1, in which the step of rendering the point cloud from a plurality of viewpoints comprises selecting viewpoints distributed over a lozenge-shaped surface surrounding the target object, the lozenge shape having a cylindrical portion capped by opposing hemispherical portions.

8. The method of claim 1, in which:
the steps of selecting a target object and sampling the target object occur whilst the virtual environment is being generated for another purpose; and
the steps of rendering the point cloud, detecting rendered voxels, forming a surface only point cloud and generating a model for 3D printing occur after the virtual environment is no longer being generated for the another purpose.

9. A non-transitory, computer readable medium having computer executable instructions stored thereon, and which when executed by a computer system, cause the computer system to generate a model for 3D printing, by carrying out actions, comprising:
selecting a target object within a virtual environment;
sampling the target object to form a point cloud, the point cloud comprising points corresponding to an outer surface of the target object and also one or more internal features of the target object;
rendering the point cloud from a plurality of viewpoints using voxels in place of the points in the point cloud;
detecting which voxels and hence which points of the cloud were rendered over the plurality of renders;
forming a surface-only point cloud comprising those points of the cloud that were rendered; and
generating a model for 3D printing based on the surface-only point cloud.

10. An entertainment device, comprising:
an image processor adapted to generate a virtual environment;
a selection processor adapted to select a target object within the virtual environment;
a sampling processor adapted to sample the target object to form a point cloud, the point cloud comprising points corresponding to an outer surface of the target object and also one or more internal features of the target object;
a rendering processor adapted to render the point cloud from a plurality of viewpoints using voxels in place of the points in the point cloud;
a detection processor adapted to detect which voxels and hence which points of the cloud were rendered over the plurality of renders;
a re-sampling processor adapted to form surface-only point cloud comprising those points of the cloud that were rendered; and
a modelling processor adapted to generate a model for 3D printing based on the surface-only point cloud.

11. The entertainment device of claim 10, in which the detection processor is adapted to
provide a point map having a corresponding data field for each point in the point cloud; and
update, for each rendered voxel, the data field corresponding to the respective point in the point cloud.

12. The entertainment device of claim 10, in which the rendering processor is adapted to select viewpoints distributed over a lozenge-shaped surface surrounding the target object, the lozenge shape having a cylindrical portion capped by opposing hemispherical portions.

13. The entertainment device of claim 10, in which the image processor, selection processor and sampling processor operate whilst the virtual environment is being generated for another purpose; and
the rendering processor, detection processor, re-sampling processor and modelling processor operate after the virtual environment is no longer being generated for the another purpose.

14. A server, comprising:
a receiver adapted to receive from an entertainment device a point cloud, the point cloud comprising points corresponding to an outer surface of a target object and also one or more internal features of the target object, the target object having been selected from within a virtual environment generated by the entertainment device;
a rendering processor adapted to render the point cloud from a plurality of viewpoints using voxels in place of the points in the point cloud;
a detection processor adapted to detect which voxels and hence which points of the cloud were rendered over the plurality of renders;
a re-sampling processor adapted to form surface-only point cloud comprising those points of the cloud that were rendered; and
a modelling processor adapted to generate a model for 3D printing based on the surface-only point cloud.

15. The server of claim 14, in which the rendering processor is adapted to select viewpoints distributed over a lozenge-shaped surface surrounding the target object, the lozenge shape having a cylindrical portion capped by opposing hemispherical portions.

* * * * *